United States Patent [19]

Keller

[11] 4,038,882
[45] Aug. 2, 1977

[54] VARIABLE RATIO GEAR TRANSMISSION

[75] Inventor: Dieter Keller, Friedrichsdorf, Germany

[73] Assignee: Fichtel & Sachs A.G., Schweinfurt am Main, Germany

[21] Appl. No.: 614,354

[22] Filed: Sept. 18, 1975

[30] Foreign Application Priority Data

Sept. 21, 1974 Germany .............................. 2445241

[51] Int. Cl.² .............................................. F16H 3/08
[52] U.S. Cl. ...................................... 74/331; 74/359; 74/360; 74/363; 74/375
[58] Field of Search .................. 74/325, 331, 359, 360, 74/373, 374, 375, 745, 362, 363

[56] References Cited

U.S. PATENT DOCUMENTS

| | | | |
|---|---|---|---|
| 2,276,258 | 3/1942 | Horowitz | 74/331 X |
| 2,857,772 | 10/1958 | Garnier et al. | 74/359 |
| 3,537,335 | 11/1970 | Ezpeleta | 74/331 X |
| 3,893,345 | 7/1975 | Sisson et al. | 74/331 |

FOREIGN PATENT DOCUMENTS 717,450  10/1954  United Kingdom .................... 74/359

*Primary Examiner*—Samuel Scott
*Assistant Examiner*—Lance W. Chandler
*Attorney, Agent, or Firm*—Hans Berman

[57] ABSTRACT

An axially short, variable-ratio gear transmission suitable particularly for motorcycles has a first or input shaft, a second or output shaft, and a countershaft. First and second rotatable gears on the input shaft permanently mesh with respective first and second rotatable gears on the output and counter shafts. The first and second gears on the countershaft are permanently connected for joint rotation, a first coupling permits one of the two gears on the first shaft to be coupled to the first shaft, and a second coupling similarly may couple one of the gears on the second shaft to the latter.

7 Claims, 3 Drawing Figures

VARIABLE RATIO GEAR TRANSMISSION

This invention relates to variable ratio gear transmissions, and particularly to a gear transmission whose gears are mounted on the transmission shafts in axially fixed relationship, each gear permanently meshing with another gear, and couplings being provided for coupling gears to the associated shafts for joint rotation.

It is known to provide the parallel input and output shafts of a variable gear transmission for a motorcycle with pairs of meshing gears, each pair providing a different transmission ratio, one gear of each pair being fixedly mounted on its shaft, the other gear being selectively coupled to its shaft. It is desirable to provide numerous transmission ratios in the power train of a motorcycle for road racing and in many other automotive applications. If the known transmission is to provide six speeds or transmission ratios, it needs twelve gears and at least three clutches and an axial length to accomodate the multiplicity of drive elements.

It is an important object of this invention to provide a variable ratio gear transmission of relatively simple construction and small axial length which provides numerous transmission ratios.

According to the invention, a transmission is equipped with an input shaft, an output shaft, and first and second gears rotatable on each shaft in axially fixed respective positions. Each gear on one shaft permanently meshes with a corresponding gear on the other shaft. First and second gears are also mounted on a countershaft and are permanently connected for joint rotation with each other in permanent meshing engagement with the first and second gears on the first shaft respectively. A first coupling device permits one of the first and second gears on the first shaft to be coupled to the same for joint rotation, and a second coupling device similarly may couple one of the two gears on the second shaft to the same.

Other features, additional objects, and many of the attendant advantages of this invention will readily be appreciated as the same becomes better understood by reference to the following detailed description of preferred embodiments when considered in connection with the appended drawing in which.

Figure 1:
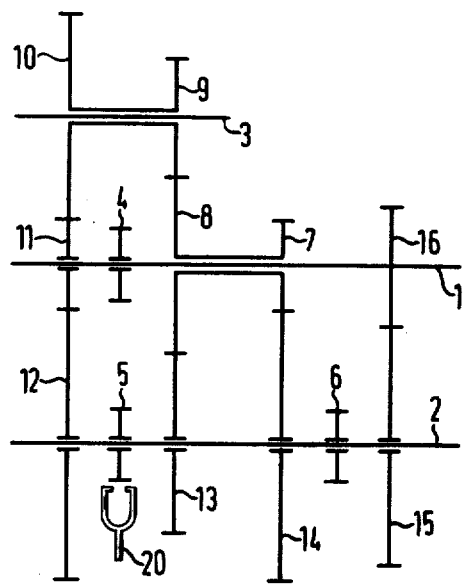
FIG. 1 illustrates a gear transmission of the invention by conventional symbols.

Referring now to the drawing in detail, and initially to FIG. 1, there is shown only as much of an otherwise conventional multiple ratio gear transmission as is needed for an understanding of the invention. Three shafts 1, 2, 3 are mounted in a non-illustrated casing. Shaft 1, hereinafter referred to as the first or input shaft, carries, in axial sequence, four gears of which a first gear 11 is freely rotatable on the shaft in an axially fixed position. The second and third gears 8, 7 are fixedly fastened to each other for joint rotation on the shaft 1 in an axially fixed position. A coupling 4 is splined to the shaft 1 for joint rotation and may be shifted axially into torque transmitting engagement with the first gear 11 or the second gear 8. The coupling 4 may be a conventional, simple dog clutch or one of the more elaborate, but equally conventional synchromesh clutches. The fourth gear 16 is fixedly mounted on the input shaft 1.

Four gears 12, 13, 14, 15 on the second or output shaft 2 of the transmission are individually freely rotatable in respective fixed axial positions in permanent meshing engagement with the four gears on the input shaft 1 respectively. A second coupling 5 is arranged on the shaft 2 between the first and second gears 12, 13 for alternatively coupling these gears to the output shaft, and a third coupling 6 permits the third or fourth wheel 14, 15 to be coupled to the output shaft, the couplings 5, 6 being of the types described above. A shifting fork 20 when actuated by an operator moves the coupling 5 axially between the illustrated position and respective positions of engagement with the gears 12, 13, as is conventional in itself. The couplings 4 and 6 are equipped with analogous forks which were omitted from the drawing in order not to crowd the same.

The countershaft 3 carries first and second gears 9, 10 which are fixedly connected for joint rotation about the axis of the shaft 3 while permanently meshing with the first and second gears 11, 8 on the input shaft 1. In the illustrated embodiment, the shaft 3 is fixedly mounted in the nonillustrated transmission casing, and the gears 9, 10 are jointly rotatable on the shaft, but an equivalent arrangement in which the shaft 3 turns with the gears 9, 10 may be chosen.

The transmission shown in FIG. 1 includes 10 gears and three couplings or clutches. Its axial minimum length is determined by the axial dimensions of four gears and two couplings, and by the strokes of the couplings. Yet, it provides seven transmission ratios as is shown in FIG. 2.

The upper half of FIG. 2 again shows the apparatus of FIG. 1 on a smaller scale and additionally contains reference characters $a$ to $f$ designating the gear ratios of the six, meshingly engaged pairs of gears. The ratios $a$ to $d$ of the four gears 11, 8, 7, 16 on the input shaft 1 to the four gears 12, 13, 14, 15 on the output shaft 2 are taken in the direction of respective arrows, and the gear ratios $e$ and $f$ between the first and second gears 10, 9 on the countershaft 3 to the corresponding gears 11, 8 on the input shaft are similarly labeled by arrows.

Figure 2:
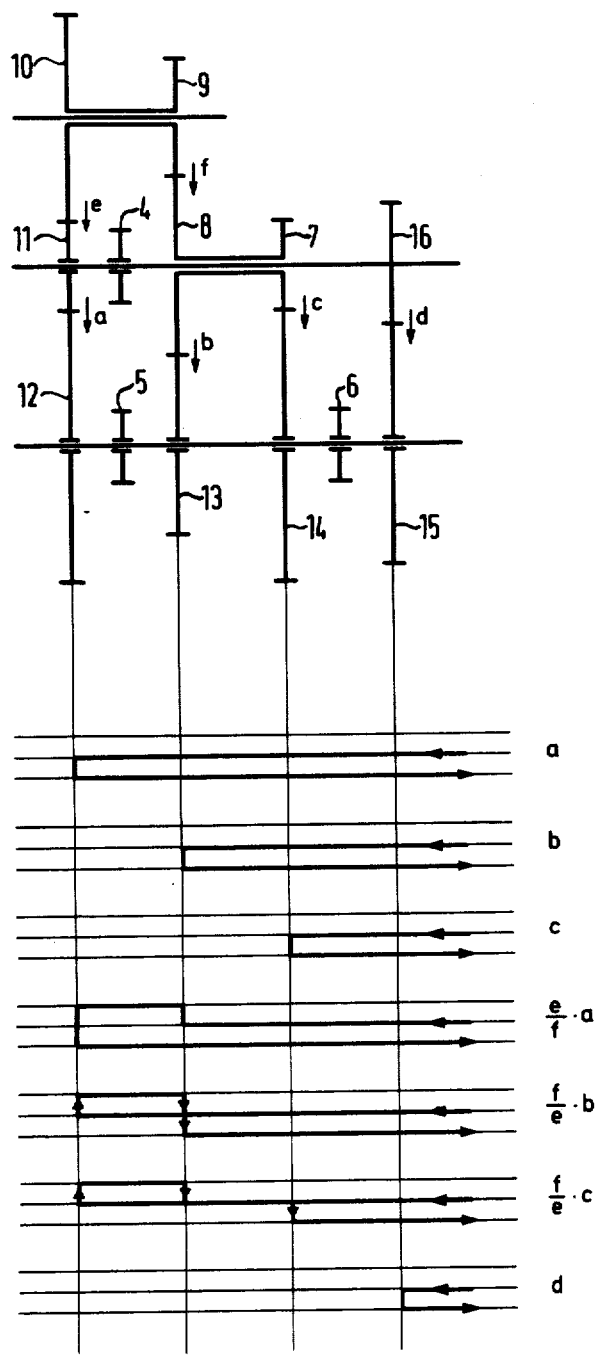
FIG. 2 is a diagram assigning reference characters to the gear ratios of the several pairs of meshingly engaged gears in the transmission of FIG. 1, and illustrating the several transmission ratios available.

By suitably engaging the three couplings 4, 5, 6, seven transmission ratios between the input shaft 1 and the output shaft 2 are obtained, the flow of torque through the transmission being indicated by heavy lines in the lower half of FIG. 2 in which the three parallel lines in each of seven groups represent the three shafts 3, 1, 2, whereas the intersections of the shaft lines with lines passing through the gears in the upper half of FIG. 2 represent the gears.

An overall transmission ratio $a$, equal to the transmission ratio between the first gears 11, 12 on the input and output shafts 1, 2, can be had by engaging the couplings 4, 5 with the first gears. When these couplings are engaged with the second gears 8, 13, the overall transmission ratio is $b$. The transmission ratio $c$ requires engaging the coupling 4 with the second gear 8, and thereby with the third gear 7 on the input shaft 1, while engaging the coupling 6 with the third gear 14 on the output shaft 2.

For a transmission ratio $ea/f$, the second gear 8 is coupled to the input shaft 1, and the first gear 12 to the output shaft 2, torque between the gears 8 and 12 being transmitted by the connected gears 9, 10 on the countershaft 3 and the first gear 11 on the input shaft. When the first gear 11 is coupled to the input shaft 1, and the second gear 13 is coupled to the output shaft 2, the transmission ratio is $fb/e$, the two gears 9, 10 on the countershaft 3 and the second gear 8 on the input shaft participating in the torque transmission.

Coupling the first gear 11 to the input shaft 1 and the third gear 14 to the output shaft 2 causes torque to be transmitted between the shafts at a ratio of $fc/e$ through the gears 10, 9, 8, 7. Ultimately, a gear ratio $d$ is available when the fourth gear 15 is coupled to the output shaft 2. Not all the gears need be provided or used if fewer than seven different speeds are required, and the gears may be selected to meet desired operating conditions within numerical values inherent in the relationships shown in FIG. 4. The numerical ratio of $b$ to $c$ must be equal to the numerical ratio between $fb/e$ to $fc/e$ and the like. Only the ratio $d$ may be selected freely.

The following Examples further illustrate the application of transmissions of the invention and the necessary selection of gear ratios.

EXAMPLE 1

A motorcycle for travel on roads was to be equipped with a five-speed transmission differing from that shown in FIG. 1 by omission of the fourth gears 15, 16. It was required that the numerical ratio between successive speeds decrease from the lowest to the highest speed, and the numerical ratio of the highest and lowest transmission ratios was determined by the characteristics of the associated engine as 1:3.225.

Five transmission ratios of 3.225, 2.14, 1.507, 1.18, and 1.0 were obtained corresponding, in the same sequence, to gear ratios $fc/e$, $c$, $fb/e$, $a$, and $b$. The numerical ratios of the four successive steps from the lowest to the highest speed were 1.507, 1.42, 1.277, and 1.18 as required, and the numerical ratio of the first and third transmission ratios was equal to the numerical ratio of the second and fifth transmission ratios and equal to $c$.

EXAMPLE 2

For a motorcycle intended for travel over rough terrain, the differences between transmission ratios at the higher speeds may be somewhat greater than in the transmission described in Example 1, and it is preferred that numerical ratios of adjacent transmission ratios be equal. The overall range of transmission ratios was fixed by engine considerations to 1:3.54.

A five-speed transmission having the same basic structure as that of Example 1, that is, eight gears and three couplings, satisfied these requirements when the five transmission ratios were 3.54 (a), 2.15 ($fc/e$), 1.664 ($fb/e$), 1.29 (c), and 1.0 (b), the numerical ratio of the first and second transmission ratios or speeds being 1.65, and the three other numerical ratios being each 1.29.

EXAMPLE 3

Three six-speed transmissions, each including the ten gears and three couplings shown in FIG. 1, were built to the transmission ratios and numerical ratios shown in Tables 1 to 3, the first two transmissions being suitable for motorcycles mainly traveling on roads, the third for roadless driving. The requirement that $b:c = fb/e : fc/e$ was met in each transmission.

TABLE 1

| Speed | I | II | III | IV | V | VI |
|---|---|---|---|---|---|---|
| Gear Ratio | d | fc/e | fb/e | c | a | b |
| Tr. Ratio | 3.2 | 2.01 | 1.56 | 1.29 | 1.122 | 1.0 |
| Num. Ratio |  | 1.59 | 1.29 | 1.21 | 1.15 | 1.122 |

TABLE 2

| Speed | I | II | III | IV | V | VI |
|---|---|---|---|---|---|---|
| Gear Ratio | d | fc/e | c | fb/e | a | b |
| Tr. Ratio | 3.2 | 2.077 | 1.61 | 1.29 | 1.11 | 1.0 |
| Num. Ratio |  | 1.54 | 1.29 | 1.25 | 1.16 | 1.11 |

TABLE 3

| Speed | I | II | III | IV | V | VI |
|---|---|---|---|---|---|---|
| Gear Ratio | d | a | fc/e | fb/e | c | b |
| Tr. Ratio | 3.7 | 2.39 | 1.77 | 1.464 | 1.21 | 1.0 |
| Num. Ratio |  | 1.55 | 1.35 | 1.21 | 1.21 | 1.21 |

EXAMPLE 4

The gear ratio ea/f is not conveniently employed for a transmission ratio and was not utilized in Examples 1 to 3 which illustrate variable ratio transmissions of the invention having one fewer speed than can be achieved with the structural elements available. However, useful seven-speed transmissions utilizing all seven available gear ratios have been built and their characteristics are listed in Tables 4 to 6.

TABLE 4

| Speed | I | II | III | IV | V | VI | VII |
|---|---|---|---|---|---|---|---|
| Gear Ratio | d | fc/e | c | fb/e | a | b | ea/f |
| Transmission Ratio | 3.8 | 2.573 | 1.917 | 1.558 | 1.342 | 1.16 | 1.0 |
| Numerical Ratio |  | 1.475 | 1.342 | 1.23 | 1.16 | 1.157 | 1.16 |

TABLE 5

| Speed | I | II | III | IV | V | VI | VII |
|---|---|---|---|---|---|---|---|
| Gear Ratio | d | fc/e | c | fb/e | a | b | ea/f |
| Transmission Ratio | 3.8 | 2.544 | 1.91 | 1.546 | 1.332 | 1.16 | 1.0 |
| Numerical Ratio |  | 1.49 | 1.332 | 1.235 | 1.16 | 1.15 | 1.16 |

TABLE 6

| Speed | I | II | III | IV | V | VI | VII |
|---|---|---|---|---|---|---|---|
| Gear Ratio | a | ea/f | d | fc/e | fb/e | c | b |
| Transmission Ratio | 3.6 | 2.72 | 2.0 | 1.52 | 1.322 | 1.15 | 1.0 |
| Numerical Ratio |  | 1.322 | 1.36 | 1.315 | 1.15 | 1.15 | 1.15 |

In the seven-speed transmission characterized by the data of Table 5, the number of teeth in the gears 7 to 16 was, in numerical sequence, 22, 30, 15, 18, 27, 30, 29, 35, 38, 12.

Figure 3:
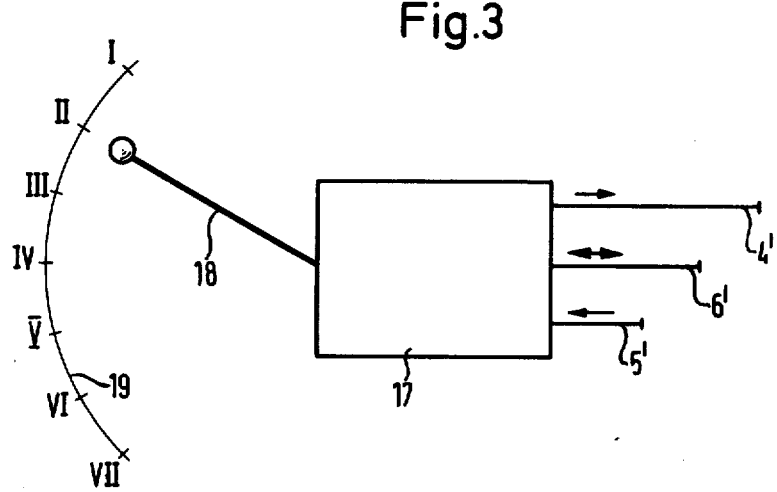
FIG. 3 illustrates a manual shifting mechanism for the transmission of FIG. 1 in plan view.

The manual shifting mechanism for moving each of the three couplings 4, 5, 6 between its three operative positions is shown in FIG. 3 in the condition required for setting the second speed in the transmission characterized by the data of Table 6, that is, for a gear ratio of

*ea/f* which, as described with reference to FIG. 2, requires the second gear 8 to be coupled to the input shaft 1, and the first gear 12 to be coupled to the output shaft.

Linkages 4', 5', 6' connect the shifting forks 20 of the couplings 4, 5, 6 respectively to a multiple cam mechanisms enclosed in a housing 17. The cams are operated by an arm 18 which sweeps a scale 19 carrying indicia I to VII corresponding to the chosen speeds. As indicated by arrows, the linkage 4' shifted the coupling 4 toward the right from the position shown in FIG. 1 to engage the second gear 8, while the linkage 5' shifted the coupling 5 toward the left, as viewed in FIG. 1 for engagement with the gear 12, when the arm 18 was swung into the illustrated position II.

While the invention has been described with reference to its application in motorcycles, variable ratio gear transmissions are widely used in other automotive vehicles and in fields remote from such vehicles, and this invention is used to advantage wherever a variable-ratio gear transmission may be called for.

It should be understood, therefore, that the foregoing disclosure relates only to preferred embodiments of the invention and that it is intended to cover all changes and modifications of the examples of the invention herein chosen for the purpose of the disclosure which do not constitute departures from the spirit and scope of the invention set forth in the appended claims.

What is claimed is:

1. A variable ratio gear transmission comprising:
   a. a first shaft;
   b. a second shaft;
   c. first and second gear rotatable on each of said shafts in axially fixed respective positions,
      1. each gear on one of said shafts permanently meshing with the corresponding gear on the other shaft;
   d. a countershaft;
   e. first and second gears mounted on said countershaft and permanently connected for joint rotation in permanent meshing engagement with said first and second gears on said first shaft respectively;
   f. first coupling means for coupling one of said first and second gears on said first shaft to said first shaft for joint rotation; and
   g. second coupling means for coupling to said second shaft one of said first and second gears on said second shaft.

2. A transmission as set forth in claim 1, further comprising a third gear rotatable on said first shaft and permanently connected to said second gear on said first shaft for joint rotation, said first coupling means including means for alternatively coupling one of said first and second gears on said first shaft to said first shaft for joint rotation.

3. A transmission as set forth in claim 2, further comprising a third gear rotatable on said second shaft in meshing engagement with said third gear on said first shaft, and third coupling means for coupling said third gear on said second shaft to said second shaft for joint rotation.

4. A transmission as set forth in claim 3, further comprising a fourth gear fixedly mounted on said first shaft, and a fourth gear rotatably mounted on said second shaft, said third coupling means including means for alternatively coupling said third and fourth gears on said second shaft with said second shaft for joint rotation.

5. A transmission as set forth in claim 4, further comprising manual means for simultaneously operating said first, second, and third coupling means.

6. A transmission as set forth in claim 1, further comprising manual means for simultaneously operating said first second coupling means.

7. A transmission as set forth in claim 1, wherein said first and second gears mounted on said countershaft are jointly rotatable on said countershaft.

* * * * *